(12) United States Patent
Fujiwara

(10) Patent No.: US 9,022,074 B2
(45) Date of Patent: May 5, 2015

(54) PLUG FOR HEAT-CONDUCTING TUBE, DEVICE FOR ATTACHING PLUG FOR HEAT-CONDUCTING TUBE, AND METHOD FOR PLUGGING HEAT CONDUCTING TUBE

(75) Inventor: Hiroyuki Fujiwara, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 88 days.

(21) Appl. No.: 13/876,619

(22) PCT Filed: Feb. 10, 2012

(86) PCT No.: PCT/JP2012/053115
§ 371 (c)(1),
(2), (4) Date: Mar. 28, 2013

(87) PCT Pub. No.: WO2012/120969
PCT Pub. Date: Sep. 13, 2012

(65) Prior Publication Data
US 2013/0186501 A1   Jul. 25, 2013

(30) Foreign Application Priority Data

Mar. 8, 2011 (JP) ................. 2011-050743

(51) Int. Cl.
*F16L 55/10* (2006.01)
*B65D 59/02* (2006.01)
(Continued)

(52) U.S. Cl.
CPC ............... *B65D 59/02* (2013.01); *F28F 11/02* (2013.01); *F16L 55/136* (2013.01)

(58) Field of Classification Search
CPC ......... F16L 55/13; F16L 55/136; F28F 11/02; G21C 13/067; B25B 27/02

USPC ......... 138/89, 97; 220/234; 376/203; 165/71; 411/55, 72

See application file for complete search history.

(56) References Cited

U.S. PATENT DOCUMENTS 4,390,042 A * 6/1983 Kucherer et al. ............... 138/89
4,436,117 A   3/1984 Martin
(Continued)

FOREIGN PATENT DOCUMENTS

JP   62-293096 A   12/1987
JP   3-021689 U    3/1991
JP   6-103160 B2   12/1994

OTHER PUBLICATIONS

International Search Report for PCT/JP2012/053115, mailing date of Apr. 10, 2012.
(Continued)

*Primary Examiner* — Patrick F Brinson
(74) *Attorney, Agent, or Firm* — Westerman, Hattori, Daniels & Adrian, LLP

(57) ABSTRACT

A plug for heat-conducting tubes is equipped with: a plug main body, which is formed so as to be capable of being inserted into the heat-conducting tubes; a columnar member, which is capable of being inserted into and removed from the plug main body from the cylindrical open end of the plug main body, and has at its outer circumference a tapered surface; and a wedge member, which is formed so as to be capable of being inserted into and removed from the plug main body from the cylindrical open end of the plug main body, and has at its inner circumference a tapered surface which opposes the tapered surface of the columnar member when the wedge member is inserted into the plug main body.

3 Claims, 9 Drawing Sheets

(51) Int. Cl.
*F28F 11/02* (2006.01)
*F16L 55/136* (2006.01)

(56) References Cited

U.S. PATENT DOCUMENTS

| | | | |
|---|---|---|---|
| 4,751,944 A * | 6/1988 | Sinha et al. | 138/89 |
| 4,765,374 A | 8/1988 | Ermold et al. | |
| 4,771,810 A | 9/1988 | Ermold et al. | |
| 4,787,420 A | 11/1988 | Wilhelm | |
| 4,982,763 A * | 1/1991 | Klahn | 138/89 |
| 5,456,290 A * | 10/1995 | Haberman et al. | 138/89 |
| 6,883,547 B1 * | 4/2005 | Jorgensen | 138/89 |
| 6,981,524 B2 * | 1/2006 | Jorgensen | 138/89 |

OTHER PUBLICATIONS

Written Opinion of PCT/JP2012/053115, mailing date of Apr. 10, 2012.
Extended European Search Report dated Sep. 2, 2014, issued in corresponding European Patent Application No. 12755690.0 (5 pages).
Decision to Grant a Patent dated Feb. 10, 2015, issued in Japanese Application No. 2011-050743, w/English translation. (4 pages).

* cited by examiner

US 9,022,074 B2

PLUG FOR HEAT-CONDUCTING TUBE, DEVICE FOR ATTACHING PLUG FOR HEAT-CONDUCTING TUBE, AND METHOD FOR PLUGGING HEAT CONDUCTING TUBE

FIELD

The present invention relates to a plug for heat-conducting tubes, which is used to plug the heat-conducting tubes and thus block off the heat-conducting tubes to repair the heat-conducting tubes, a device for attaching a plug for heat-conducting tubes, which is used to mount the plug for heat-conducting tubes to the heat-conducting tubes, and a method of plugging heat-conducting tubes, which is used to mount a plug for heat-conducting tubes to the heat-conducting tubes and thus plug the heat-conducting tubes.

BACKGROUND

For example, a steam generator used for a PWR (Pressurized Water Reactor) involves a concern that radioactive water leaks from a primary side to mix in non-radioactive water on a secondary side when a side wall of a U-letter shaped heat-conducting tube incorporated therein exceeds a permissible level and thus deteriorates. For this reason, there is a known scheme in which the concern of being mixed is prevented by blocking off an end of the heat-conducting tubes involving deterioration or a possibility of deterioration.

Previously, for example, a plugging device of a tube disclosed in Patent Literature 1 includes a tubular plug shell including an open end which is open at one end and a closed end which is closed at the other end, an expander element that is incorporated in the plug shell and movably provided between the closed end and the open end, and an expansion unit including a supply source of pressurized hydraulic fluid for facilitating a movement of the expander element by introducing pressurized hydraulic fluid into the plug shell. In addition, a plugging method of a tube disclosed in Patent Literature 1 introduces pressurized hydraulic fluid into a plug shell using the plugging device described above to expand the plug shell in a radial direction, and facilitates a movement of an expander element between a closed end and an open end of the plug shell.

In the device of Patent Literature 1 described above, the inside of a hollow of the plug shell is surrounded by a tapered inner wall surface. The inner wall surface has a circular cross-sectional surface in a traverse direction with respect to an axis line in a longitudinal direction of the plug shell. In addition, the inner wall surface converges so that the open end of the plug shell is a minimum area, and expands so that the closed end of the plug shell is a maximum area. On the other hand, the expander element includes a conical main body in a shape of a cork, and the conical taper is substantially equally formed with the taper of the inner wall surface of the plug shell. In the method of Patent Literature 1 described above, a threaded portion of a front end of a draw bar member in the expansion unit is screwed with a threaded hole of a main body in the expander element, and the expander element is moved from the closed end to the open end within the plug shell by the expansion unit. In this way, the taper of the expander element comes into contact with the taper of the plug shell, and the plug shell is pushed outside in a radial direction by a wedge effect, thereby causing the plug shell to stick to the inner wall surface of the heat-conducting tubes and block off the heat-conducting tubes.

CITATION LIST

Patent Literature

Patent Literature 1: Japanese Patent Application Laid-open No. 6-103160

SUMMARY

Technical Problem

However, the device of Patent Literature 1 described above needs to be manufactured such that the expander element is incorporated in the plug shell since the taper of the inner wall surface of the plug shell converges to have a minimum area at the open end, and the taper of the expander element is substantially equally formed with the taper of the inner wall surface of the plug shell. Specifically, the open end of the plug shell is expanded so that at least a large diameter portion of the expander element passes through the open end of the plug shell. The open end of the plug shell is subjected to a drawing so as to have a minimum area in a state in which the expander element is disposed inside the plug shell. The drawing is not easily performed, and requires an advanced technique and time. Furthermore, in the device of Patent Literature 1 described above, a minimum thickness portion of the plug shell is difficult to be examined after completion since the expander element is constantly incorporated in the plug shell. The device has a critical role in blocking off an end of the heat-conduction tube involving deterioration or a possibility of deterioration to prevent the concern that radioactive water leaks from a primary side of the steam generator to mix in non-radioactive water on a secondary side, and it is important to examine a thickness of the plug shell before use to ensure integrity of the plug shell.

The invention is conceived to resolve the above subject, and an objection of the invention is to provide a plug for heat-conducting tubes and a method of plugging heat-conducting tubes that may easily conduct an examination before use to facilitate manufacturing and maintain a plugging function, and another objection of the invention is to provide a device for attaching a plug for heat-conducting tubes that may easily install the plug of the heat-conducting tubes in the heat-conducting tubes.

Solution to Problem

In order to achieve the object, a plug for heat-conducting tubes according to the present invention, which is used to plug the heat-conducting tubes and thus block off the heat-conducting tubes, includes: a plug main body which is formed so as to be capable of being inserted into the heat-conducting tubes, and is formed with a cylindrical closed end and a cylindrical open end; a columnar member which is capable of being inserted into and removed from the plug main body from the cylindrical open end of the plug main body, and in which an outer circumference is provided with a tapered surface having an outer diameter gradually decreasing in a direction of the open end of the plug main body when the columnar member is inserted into the plug main body; and a wedge member which is formed so as to be capable of being inserted into and removed from the plug main body from the cylindrical open end of the plug main body, and in which an inner circumference is provided with a tapered surface having an inner diameter gradually decreasing in the direction of the open end of the plug main body and opposing the tapered surface of the columnar member when the wedge member is inserted into the plug main body.

According to the plug for heat-conducting tubes, when the columnar member and the wedge member are inserted into the plug main body such that the tapered surfaces of the columnar member and the wedge member are opposed to each other, and the columnar member is moved to the open end of the plug main body, the tapered surface of the columnar member comes into sliding contact with the tapered surface of the wedge member, a diameter of the wedge member is expanded, and thus a diameter of the plug main body expands so that the plug main body comes into contact with an inner circumferential surface of the heat-conducting tubes. As a result, the heat-conducting tubes is plugged and thus blocked off by the plug main body. In the plug for heat-conducting tubes, since the columnar member and the wedge member are formed to be capable of being inserted into and removed from the plug main body, the plug main body, the columnar member, and the wedge member may be separately processed, respectively. Thus, special processing such as conventional drawing is not necessary, and manufacturing may be easily performed. Furthermore, since the plug main body, the columnar member, and the wedge member may be separate bodies, it is possible to easily conduct an examination before use to maintain a plugging function for the plug main body.

Also, the plug for heat-conducting tubes according to the present invention, includes a plurality of protrusions which are arranged in parallel in a longitudinal direction and are continuous in a circumferential direction on an outer circumference of the plug main body in a portion where the wedge member is disposed in a state in which the columnar member is inserted to reach a blocked portion of the plug main body, and the tapered surfaces of the columnar member and the wedge member are opposed to each other.

According to the plug for heat-conducting tubes, since the columnar member is inserted to reach the blocked portion of the plug main body, and a position of the wedge member is determined in a positional relation in which the tapered surfaces of the columnar member and the wedge member are opposed to each other, it is possible to specify a portion that comes into contact with the inner circumferential surface of the heat-conducting tubes by a diameter expansion of the plug main body associated with a diameter expansion of the wedge member. For this reason, when the protrusion is provided to the outer circumference of the plug main body in a portion where the wedge member is disposed, it is possible to appropriately provide the protrusion at a position where the heat-conducting tubes is blocked off, and it is possible to reliably block off the heat-conducting tubes. Furthermore, since a portion that comes into contact with the inner circumferential surface of the heat-conducting tubes may be identified by the diameter expansion of the plug main body associated with the diameter expansion of the wedge member, it is possible to facilitate processing without needlessly providing a protrusion.

Also, the plug for heat-conducting tubes according to the present invention, the wedge member is formed to be harder than the plug main body, and is formed to be softer than the columnar member.

According to the plug for heat-conducting tubes, it is possible to easily expand a diameter of the wedge member by a movement of the columnar member, and it is possible to maintain a shape in which a diameter of the plug main body is expanded by the wedge member having an expanded diameter.

In order to achieve the object, a device for attaching a plug for heat-conducting tubes according to the present invention, which is used to mount the above plug for heat-conducting tubes to the heat-conducting tubes, includes: a rod-shaped member in which a distal end inserted from the open end of the plug main body is fitted to the columnar member; a contact member into which the rod-shaped member is inserted, and in which a front end inserted from the open end of the plug main body comes into contact with an end of the wedge member; and a movement unit that moves the rod-shaped member such that the rod-shaped member is pulled out from the open end of the plug main body.

According to the device for attaching the plug for heat-conducting tubes, the columnar member fitted to the rod-shaped member is moved by the movement unit, and a movement of the wedge member associated with a movement of the columnar member is regulated by the contact member. In this way, it is possible to easily install the plug for heat-conducting tubes in the heat-conducting tubes.

Also, the device for attaching a plug for heat-conducting tubes according to the present invention, the front end of the contact member comes into contact with the end of the wedge member, and a proximal end of the contact member comes into contact with a verge of opening of the plug main body in a state in which the tapered surfaces of the columnar member and the wedge member are opposed to each other.

According to the device for attaching the plug for heat-conducting tubes, a movement of the wedge member associated with a movement of the columnar member is regulated by the contact member while positioning the plug main body in the heat-conducting tubes in a state in which the plug for heat-conducting tubes is inserted into the heat-conducting tubes. Accordingly, it is possible to easily install the plug for heat-conducting tubes in a desired position of the heat-conducting tubes.

In order to achieve the object, a method of plugging heat-conducting tubes according to the present invention, which is used to mount the above plug for heat-conducting tubes to the heat-conducting tubes and thus plug the heat-conducting tubes, includes: inserting the columnar member into the plug main body; subsequently, inserting the wedge member into the plug main body, and causing the tapered surfaces of the columnar member and the wedge member to be opposed to each other; subsequently, inserting the plug main body into the heat-conducting tubes; and subsequently, moving the columnar member to the open end of the plug main body.

According to the method of plugging heat-conducting tubes, when the columnar member and the wedge member are inserted into the plug main body such that the tapered surfaces of the columnar member and the wedge member are opposed to each other, and the columnar member is moved to the open end of the plug main body, the tapered surface of the columnar member comes into sliding contact with the tapered surface of the wedge member, a diameter of the wedge member is expanded, and thus a diameter of the plug main body expands so that the plug main body comes into contact with an inner circumferential surface of the heat-conducting tubes. As a result, the plug for heat-conducting tubes may be easily installed in the heat-conducting tubes. According to the method of plugging heat-conducting tubes, when the plug main body, the columnar member, and the wedge member are separate bodies, respectively, the plug main body, the columnar member, and the wedge member may be separately processed, respectively. Thus, special processing such as conventional drawing is not necessary, and manufacturing may be easily performed. Furthermore, since the plug main body, the columnar member, and the wedge member may be separate bodies, it is possible to easily conduct an examination before use to maintain a plugging function for the plug main body.

Advantageous Effects of Invention

According to the invention, it is possible to facilitate manufacturing, and easily conduct an examination before use to maintain a plugging function.

DESCRIPTION OF EMBODIMENTS

Hereinafter, Embodiments according to the invention will be described in detail based on drawings. It should be noted that the invention is not limited to Embodiments. In addition, components in Embodiments below include a component that may be easily substituted by those skilled in the art, or the substantially same component.

Figure 1:
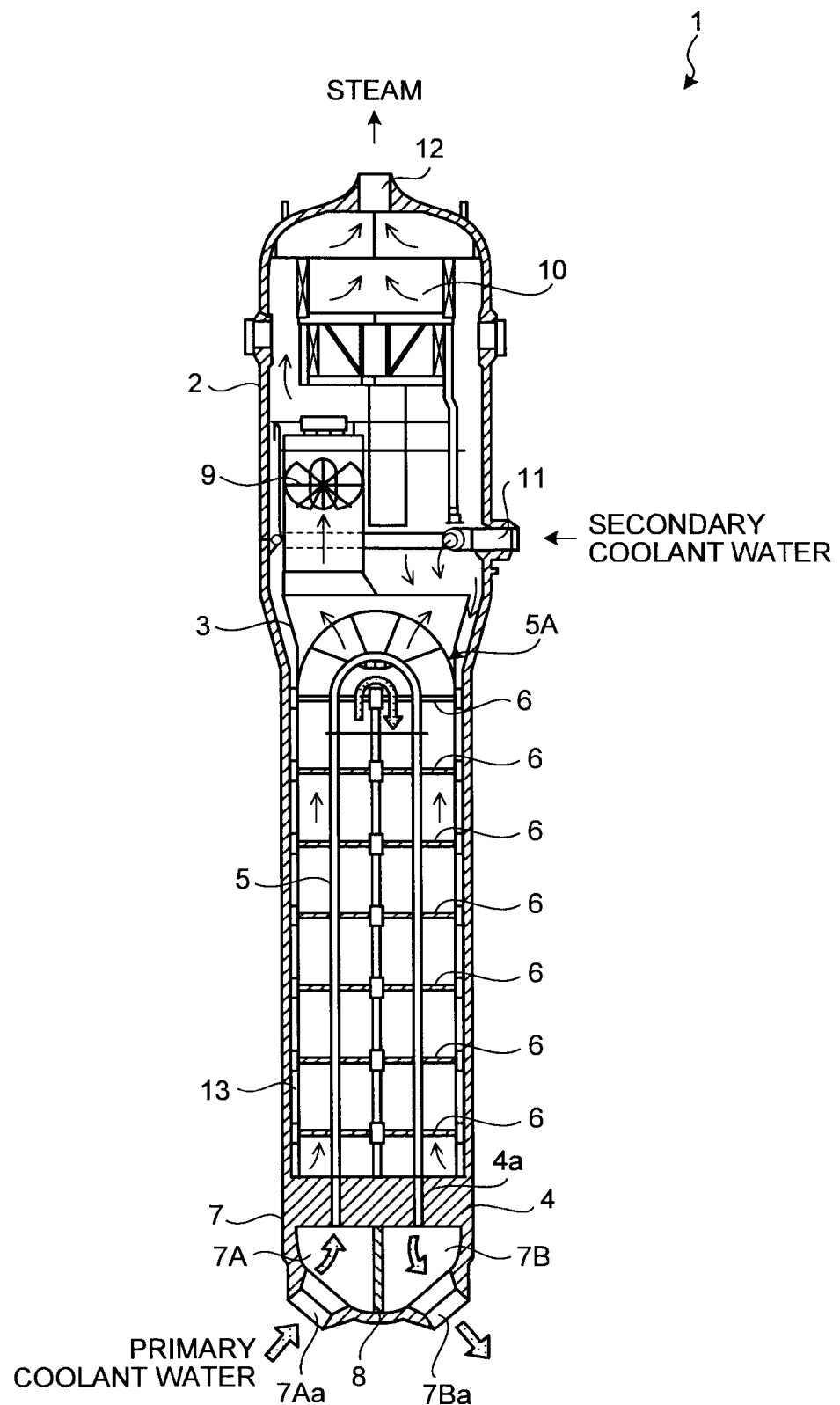
FIG. 1 is a sectional side schematic view of a steam generator according to Embodiments of the invention.

FIG. 1 is a sectional side schematic view of a steam generator according to Embodiments of the invention. For example, a steam generator 1 is used for a PWR (Pressurized Water Reactor). The PWR uses light water as a nuclear reactor coolant or a neutron moderator. The PWR sends primary coolant water which is light water as high-temperature and high-pressure water that does not boil over the entire reactor core to the steam generator 1. In the PWR, heat of the high-temperature and high-pressure primary coolant water is transferred to secondary coolant water, and water vapor is generated in the secondary coolant water. A turbine generator is rotated by the water vapor to generate electricity.

The steam generator 1 includes a body portion 2 extending in a vertical direction, and forming a sealed hollow cylindrical shape, in which a lower half portion has a slightly small diameter when compared to an upper half portion. The body portion 2 is provided with a tube bundle shroud 3 which is disposed to have a predetermined gap from an inner wall surface of the body portion 2 inside the lower half portion, and forms a cylindrical shape. The tube bundle shroud 3 is provided such that a bottom end thereof is extended up to a periphery of a tube plate 4 disposed on a lower side inside of the lower half portion of the body portion 2. A heat-conducting tube bundle 5A is provided inside of the tube bundle shroud 3. The heat-conducting tube bundle 5A includes a plurality of inverted U-shaped heat-conducting tubes 5. In each of the heat-conducting tubes 5, an arc portion of the U-letter shape is arranged upward, a bottom end is fixed by being inserted into a tube hole 4a of the tube plate 4, and an intermediate portion is supported by the tube bundle shroud 3 through a plurality of tube support plates 6. Multiple heat-conducting tube insertion holes (not illustrated) are formed in the tube support plates 6, and each of the heat-conducting tubes 5 is supported when each of the heat-conducting tubes 5 is inserted into the heat-conducting tubes insertion holes.

The body portion 2 is provided with a water room 7 at a bottom end thereof. The inside of the water room 7 is divided into an entering room 7A and an exiting room 7B by a division wall 8. The entering room 7A is communicated with one end of each of the heat-conducting tubes 5, and the exiting room 7B is communicated with the other end of each of the heat-conducting tubes 5. In addition, the entering room 7A is provided with an entrance nozzle 7Aa leading to the outside of the body portion 2, and the exiting room 7B is provided with an exit nozzle 7Ba leading to the outside of the body portion 2. The entrance nozzle 7Aa is connected to a cooling water tube (not illustrated) where the primary coolant water is sent from the PWR, and the exit nozzle 7Ba is connected to a cooling water tube (not illustrated) that sends the heat-exchanged primary coolant water to the PWR.

The inside of the upper half portion of the body portion 2 is provided with a steam-water separator 9 that separates feed-water into steam and hot water, and a moisture separator 10 that removes moisture of the separated steam to create a nearly dry steam state. A feed-water tube 11 that supplies the secondary coolant water from the outside into the body portion 2 is inserted into between the steam-water separator 9 and the heat-conducting tube bundle 5A. Further, a steam outlet 12 is formed at a top end of the body portion 2. In addition, the inside of the lower half portion of the body portion 2 is provided with a supply channel 13 that causes the secondary coolant water supplied from the feed-water tube 11 into the body portion 2 to flow down between the body portion 2 and the tube bundle shroud 3, turn back at the tube plate 4, and be raised along the heat-conducting tube bundle 5A. The steam outlet 12 is connected to a cooling water tube (not illustrated) that sends steam to a turbine, and the feed-water tube 11 is connected to a cooling water tube (not illustrated) that supplies the secondary coolant water obtained when the steam used in the turbine is cooled down in a condenser (not illustrated).

In the steam generator 1, the primary coolant water heated in the PWR is sent to the entering room 7A, and circulates through the inside of the multiple heat-conducting tubes 5 to reach the exiting room 7B. On the other hand, the secondary coolant water cooled down in the condenser is sent to the feed-water tube 11, passes through the supply channel 13 inside of the body portion 2, and rises along the heat-conducting tube bundle 5A. In this instant, heat is exchanged between the high-pressure and high-temperature primary coolant water and the secondary coolant water in the inside of the body portion 2. The cooled primary coolant water is returned to the PWR from the exiting room 7B. On the other hand, the secondary coolant water exchanging heat between the secondary coolant water and the high-pressure and high-temperature primary coolant water rises in the inside of the body portion 2, and is separated into steam and hot water in the steam-water separator 9. The separated steam is sent to the turbine after moisture is removed in the moisture separator 10.

First Embodiment

The steam generator 1 described above involves a concern that radioactive water leaks from a primary side to mix in non-radioactive water on a secondary side when a side wall of the heat-conducting tubes 5 incorporated therein exceeds a permissible level and thus deteriorates. For this reason, the concern of being mixed is prevented by blocking off an end of the heat-conducting tubes 5 involving deterioration or a possibility of deterioration. In addition, when the steam generator 1 described above is exchanged, and the used steam generator 1 is stored or dismantled, a concern of a radiation leak from the heat-conducting tubes 5 that are being stored or dismantled is prevented by blocking off an end of the heat-conducting tubes 5. A plug for heat-conducting tubes, a device for attaching a plug for heat-conducting tubes, and a method of plugging heat-conducting tubes used to plug and thus block off the heat-conducting tubes 5 in a repair of blocking off the end of the heat-conducting tubes 5 will be described below.

Figure 2:
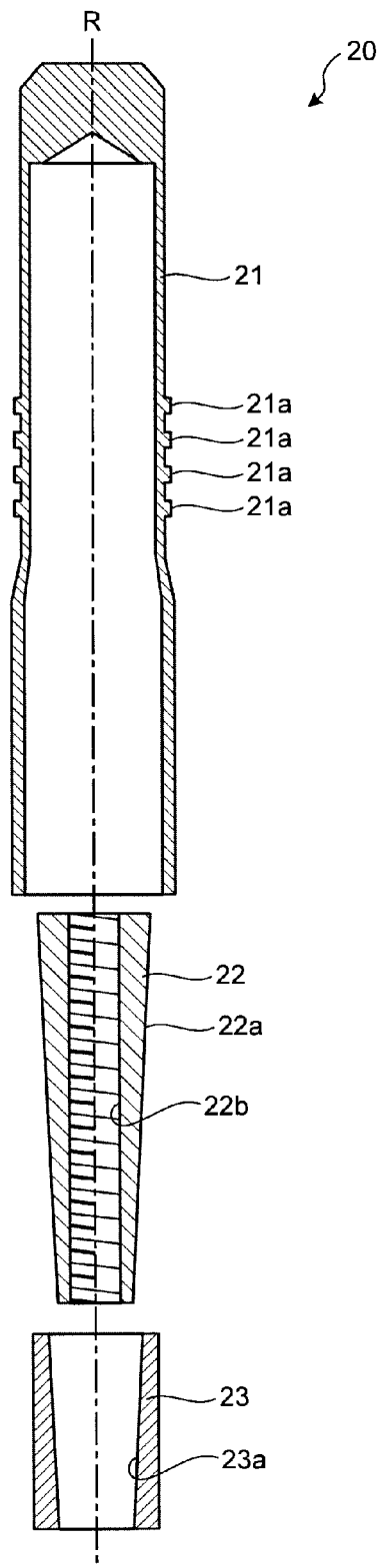
FIG. 2 is a disassembled sectional side view of a plug for heat-conducting tubes according to First Embodiment of the invention.
Figure 3:
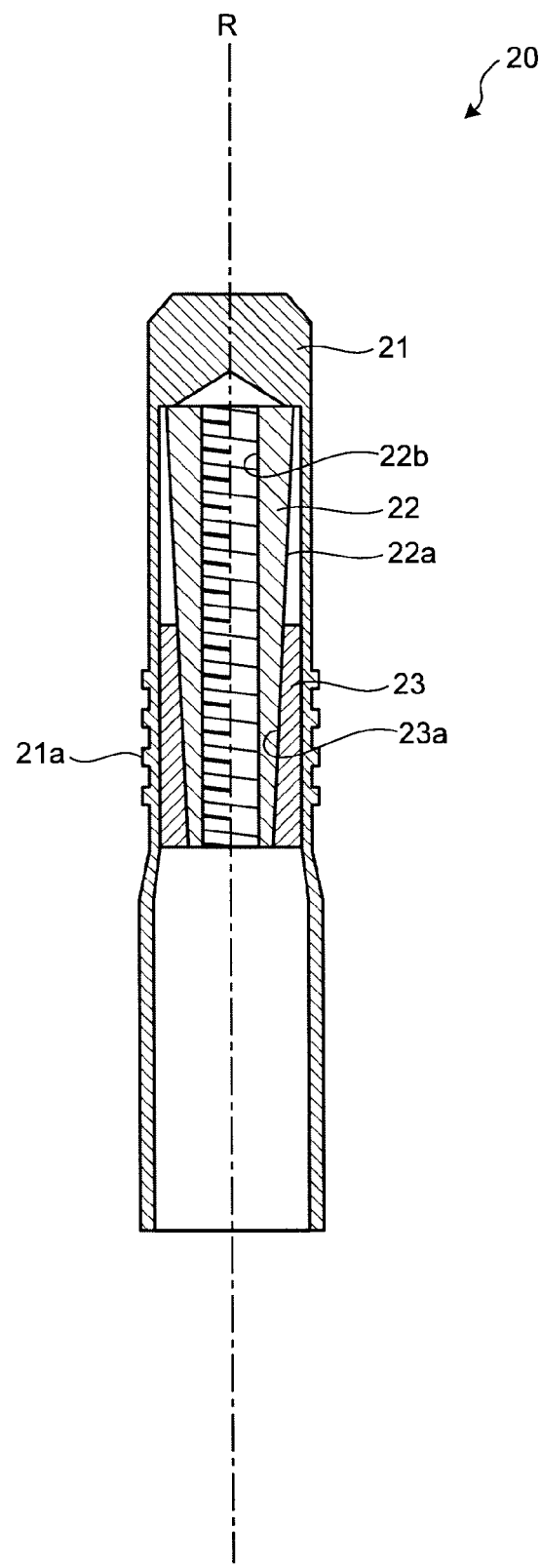
FIG. 3 is a sectional side view of a state in which the plug for heat-conducting tubes according to First Embodiment is assembled.

FIG. 2 is a disassembled sectional side view of a plug for heat-conducting tubes according to the Embodiment, and FIG. 3 is a sectional side view of a state in which the plug for heat-conducting tubes according to the Embodiment is assembled.

As illustrated in FIGS. 2 and 3, a plug for heat-conducting tubes 20 includes a plug main body 21, a columnar member 22, and a wedge member 23.

The plug main body 21 is formed in a cylindrical shape, and is formed to have an outer diameter smaller than an inner diameter of the heat-conducting tubes 5 so as to be capable of being inserted into the heat-conducting tubes 5 which are provided to be opened at a side of the water room 7 of the tube plate 4. In addition, in the plug main body 21, a cylindrical end corresponding to a front end side inserted into the heat-conducting tubes 5 is formed to be blocked, and the other cylindrical end corresponding to a tail end side is formed to be opened. In addition, as illustrated in FIG. 2, the plug main body 21 includes a plurality of (four in the Embodiment) protrusions 21a which are arranged in parallel in a longitudinal direction and are continuous in a circumferential direction on an outer circumference of a portion where the wedge member 23 described below is disposed in a state in which the columnar member 22 described below is inserted to reach a blocked portion of the plug main body 21, and tapered surfaces 22a and 23a of the columnar member 22 and the wedge member 23 are opposed to each other. The plug main body 21 is formed from a super heat-resistant material (for example, Inconel (registered trademark)) so as to be used in the steam generator 1 in use.

The columnar member 22 is formed in a columnar shape, and is formed to have an outer diameter smaller than an inner diameter of the plug main body 21 so as to be capable of being inserted into the plug main body 21 from a cylindrical open end of the plug main body 21. In addition, an outer circumference of the columnar member 22 is provided with the tapered surface 22a having an outer diameter gradually decreasing from one end side toward the other end side. The columnar member 22 is inserted into the plug main body 21 from one end side so that the tapered surface 22a has an outer diameter gradually decreasing toward the open end of the plug main body 21 in a state of being inserted into the plug main body 21. In addition, the columnar member 22 is provided to be able to move in a longitudinal direction (extending direction of an axis R) of a cylindrical shape of the plug main body 21 so as to be removed from the plug main body 21 in a state of being inserted into the plug main body 21 alone. In addition, the columnar member 22 includes an internal threaded hole 22b formed in the extending direction of the axis R corresponding to a longitudinal direction thereof. The internal threaded hole 22b is formed by penetrating the columnar member 22 in the extending direction of the axis R of the columnar member 22. The columnar member 22 is formed from a corrosion-resistant material (for example, a stainless alloy) so that the columnar member 22 can be used in the steam generator 1 in use.

The wedge member 23 is formed in a cylindrical shape, and is formed to have an outer diameter smaller than an inner diameter of the plug main body 21 so as to be capable of being inserted into the plug main body 21 from a cylindrical open end of the plug main body 21. In addition, an inner circumference of the wedge member 23 is provided with the tapered surface 23a having an inner diameter gradually decreasing from one end side toward the other end side. The wedge member 23 is inserted into the plug main body 21 from one end side so that the tapered surface 23a has an inner diameter gradually decreasing toward the open end of the plug main body 21 in a state of being inserted into the plug main body 21. In addition, one end side of the wedge member 23 is formed to have an inner diameter larger than an outer diameter of the other end side of the columnar member 22 so that the other end side (small outer diameter side) of the columnar member 22 is inserted from the one end side (large inner diameter side) of the wedge member 23. Further, the other end of the wedge member 23 is formed to have an inner diameter smaller than an outer diameter of one end side of the columnar member 22 so that the one end side (large outer diameter side) of the columnar member 22 is not removed from the other end side (small inner diameter side) of the wedge member 23. In this way, the wedge member 23 has a configuration in which the other end side (small outer diameter side) of the columnar member 22 is inserted from the one end side (large inner diameter side) of the wedge member 23, and the one end side (large outer diameter side) of the columnar member 22 is not removed from the other end side (small inner diameter side), and the tapered surfaces 22a and 23a are opposed to each other in a state in which the columnar member 22 is inserted. In addition, an outer circumference of the wedge member 23 is formed to have the same diameter from the one end side toward the other end side. The wedge member 23 is formed to be harder than the plug main body 21 by forming the plug main body 21 to be thin, and is formed from a material (Inconel (registered trademark)) softer than the columnar member 22. The wedge member 23 may be provided with a slit in a longitudinal direction of the wedge member 23 to easily expand a diameter of the wedge member 23 by a movement of the columnar member 22.

Figure 4:
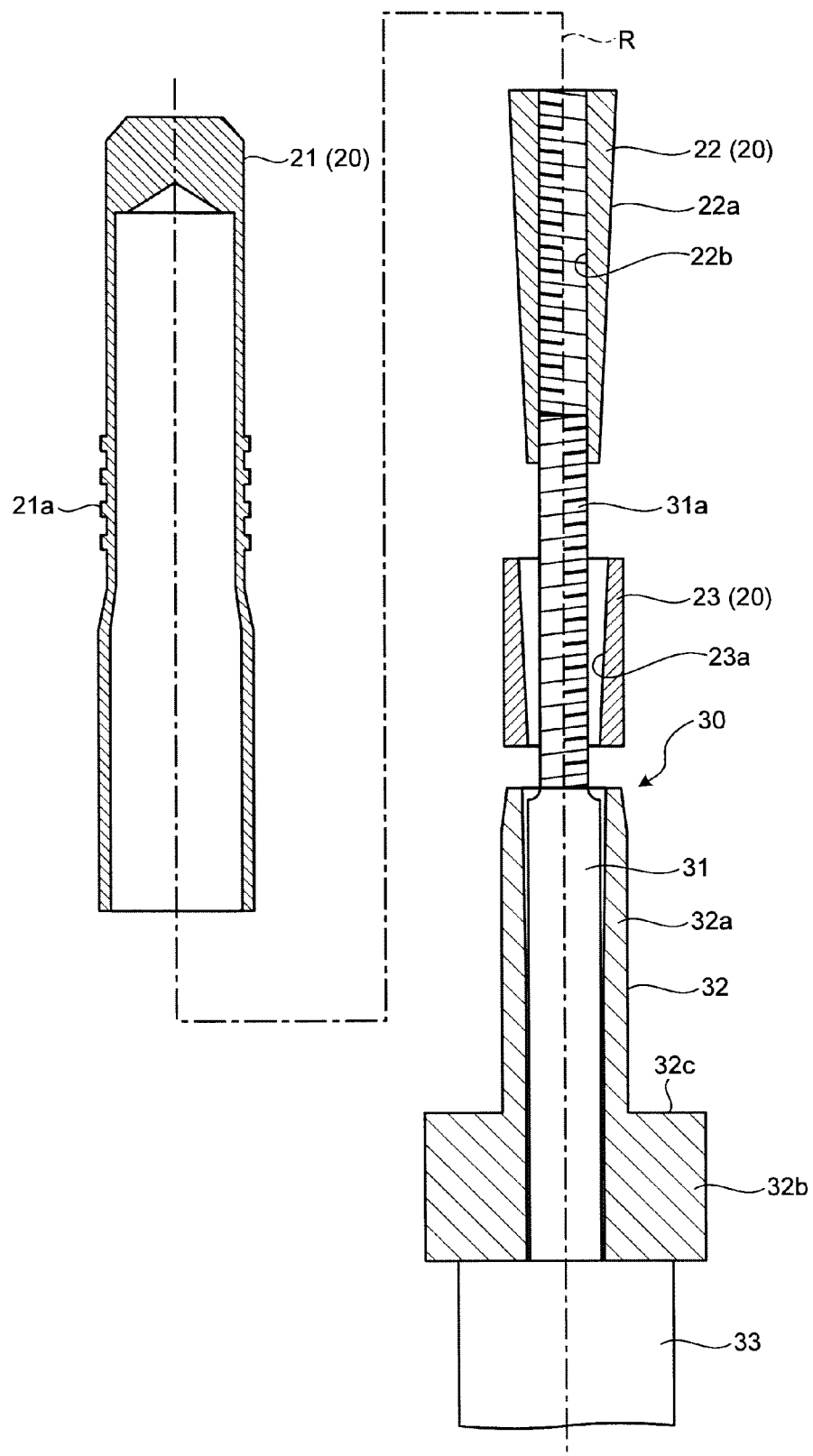
FIG. 4 is a sectional side view of a device for attaching a plug for heat-conducting tubes according to First Embodiment of the invention.

FIG. 4 is a sectional side view of a device for attaching a plug for heat-conducting tubes according to the Embodiment. FIG. 4 illustrates a form in which the plug for heat-conducting tubes 20 described above is assembled with a device for attaching a plug for heat-conducting tubes 30.

As illustrated in FIG. 4, the device for attaching the plug for heat-conducting tubes 30 includes a rod-shaped member 31, a contact member 32, and a movement unit 33.

The rod-shaped member 31 is formed as a long rod shape, and is formed such that a distal end thereof is fitted to the columnar member 22. Specifically, the distal end of the rod-shaped member 31 is provided with an external threaded portion 31a that is screwed with the internal threaded hole 22b formed in the columnar member 22. In addition, a length of the external threaded portion 31a is substantially equal to a length of the internal threaded hole 22b penetrating the columnar member 22 in the extending direction of the axis R of the columnar member 22. In addition, the rod-shaped member 31 is formed such that a proximal end side thereof has an outer diameter larger than a diameter of the external threaded portion 31a.

The contact member 32 forms a main body of the device for attaching the plug for heat-conducting tubes 30, allows the proximal end side of the rod-shaped member 31 to be inserted into the inside, and supports the rod-shaped member 31 such that the rod-shaped member 31 may move in a longitudinal direction. The contact member 32 includes a distal end 32a into which the rod-shaped member 31 is inserted is formed in a cylindrical shape, and is formed to have an outer diameter smaller than an inner diameter of the plug main body 21 so as to be capable of being inserted into the plug main body 21 from a cylindrical open end of the plug main body 21. The distal end 32a of the rod-shaped member 31 comes into contact with the other end of the wedge member 23, thereby regulating a movement to the other end side of the wedge member 23. In addition, a proximal end 32b into which the rod-shaped member 31 is inserted is formed to have an outer diameter larger than an outer diameter of the distal end 32a, and includes a flat contact surface 32c that comes into contact with a verge of opening corresponding to a cylindrical open end of the plug main body 21.

The movement unit 33 is provided in the proximal end 32b of the contact member 32, and is connected with the rod-shaped member 31 to move the rod-shaped member 31 in a direction of pulling from a cylindrical open end of the plug main body 21. Examples of a configuration of moving the rod-shaped member 31 include an actuator such as an oil pressure cylinder, an air pressure cylinder, a hydraulic motor, and a servo motor. As illustrated in FIG. 4, only the external threaded portion 31a of the rod-shaped member 31 protrudes from a head of the distal end 32a of the contact member 32 before the rod-shaped member 31 is moved in the direction of pulling the rod-shaped member 31 by the movement unit 33.

Figure 5:
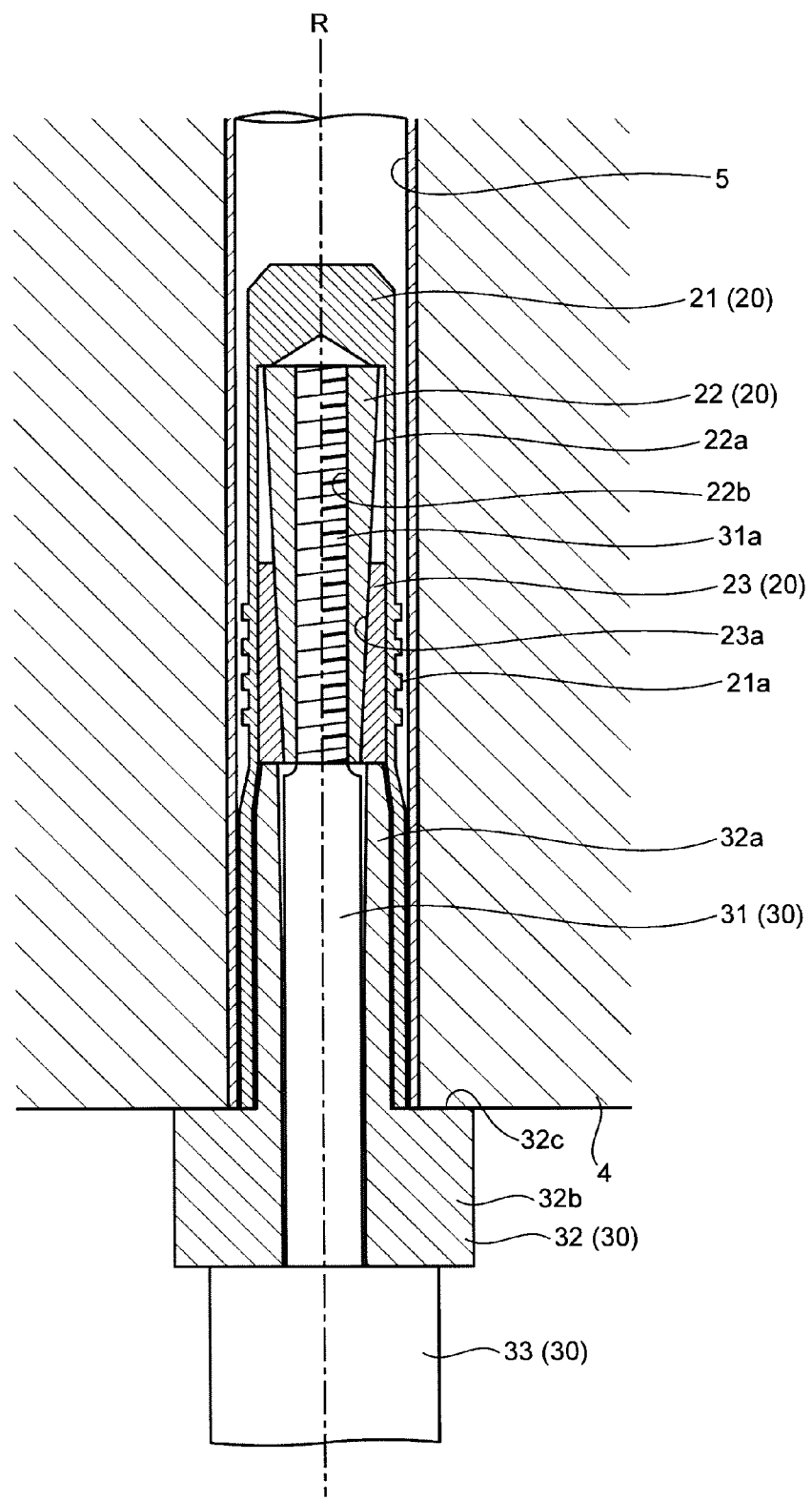
FIG. 5 is a sectional side view illustrating a method of plugging heat-conducting tubes according to First Embodiment of the invention.
Figure 6:
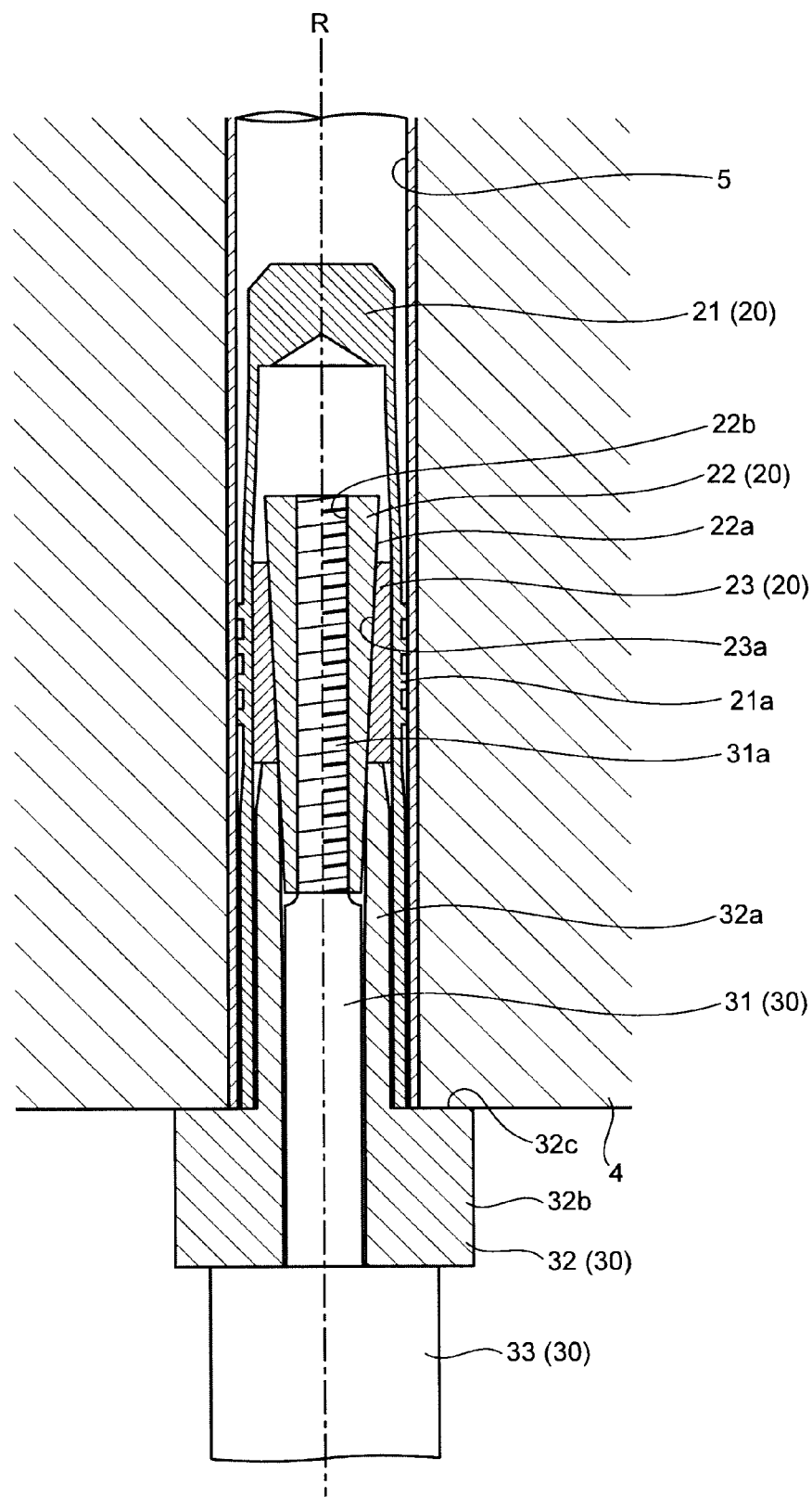
FIG. 6 is a sectional side view illustrating a method of plugging heat-conducting tubes according to First Embodiment of the invention.
Figure 7:
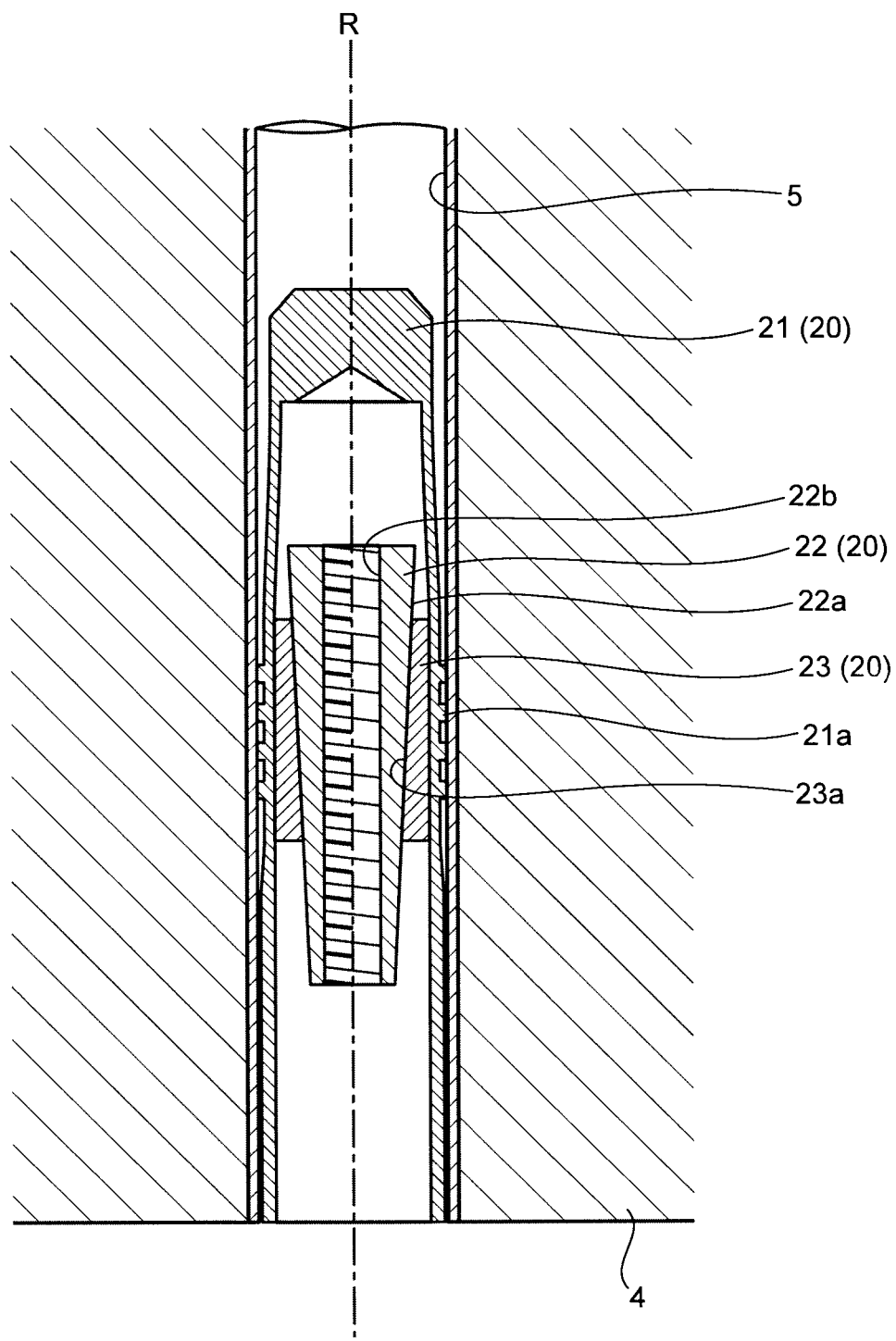
FIG. 7 is a sectional side view illustrating a method of plugging heat-conducting tubes according to First Embodiment of the invention.

FIGS. 5 to 7 are sectional side views illustrating a method of plugging heat-conducting tubes according to the Embodiment.

A method of plugging heat-conducting tubes according to the Embodiment plugs and thus blocks off the heat-conducting tubes 5 by the plug for heat-conducting tubes 20 described above using the device for attaching the plug for heat-conducting tubes 30 described above.

First, as illustrated in FIG. 4, the external threaded portion 31a of the rod-shaped member 31 protruding from a head of the distal end 32a of the contact member 32 is inserted into the wedge member 23 of the plug for heat-conducting tubes 20 before the rod-shaped member 31 is moved in the direction of pulling the rod-shaped member 31 by the movement unit 33. In this instance, the rod-shaped member 31 is inserted from the other end side of the wedge member 23 so that one end side of which an inner diameter is a large diameter in the wedge member 23 corresponds to the front end side of the rod-shaped member 31.

Next, as illustrated in FIG. 4, the rod-shaped member 31 of the device for attaching the plug for heat-conducting tubes 30 is fitted to the columnar member 22 of the plug for heat-conducting tubes 20. In this instance, the rod-shaped member 31 is inserted from the other end side of the columnar member 22 so that one end side of which an outer diameter is a large diameter in the columnar member 22 corresponds to the front end side of the rod-shaped member 31, and the external threaded portion 31a of the rod-shaped member 31 is screwed with the internal threaded hole 22b of the columnar member 22. When the external threaded portion 31a of the rod-shaped member 31 is fully screwed with the internal threaded hole 22b of the columnar member 22, a front end of the proximal end 32b of the contact member 32 comes into contact with the other end of the wedge member 23 to regulate a movement to the other end side of the wedge member 23, and thus the columnar member 22 is inserted into the wedge member 23, and the tapered surfaces 22a and 23a are opposed to each other (see FIG. 5).

Next, the rod-shaped member 31 and the distal end 32a of the contact member 32 together with the columnar member 22 and the wedge member 23 are inserted into the plug main body 21 from a cylindrical open end of the plug main body 21. In this instance, when one end side of the columnar member 22 is inserted to reach the blocked portion of the plug main body 21, the distal end 32a of the contact member 32 is fully inserted into the plug main body 21, and the contact surface 32c of the proximal end 32b of the contact member 32 comes into contact with a verge of opening of the plug main body 21 (see FIG. 5). In this way, the plug for heat-conducting tubes 20 is assembled with the device for attaching the plug for heat-conducting tubes 30.

Next, as illustrated in FIG. 5, the plug for heat-conducting tubes 20 assembled with the device for attaching the plug for heat-conducting tubes 30 as described above is inserted into the heat-conducting tubes 5 from a blocked side of the plug main body 21. In this instance, the contact surface 32c of the proximal end 32b of the contact member 32 comes into contact with a surface which corresponds to an open end of the heat-conducting tubes 5 and is on a side of the water room 7 of the tube plate 4 in a state in which the plug main body 21 is fully inserted into the heat-conducting tubes 5.

Next, as illustrated in FIG. 6, the rod-shaped member 31 is moved to be pulled out from an open end of the plug main body 21 by the movement unit 33 of the device for attaching the plug for heat-conducting tubes 30. In this instance, the contact surface 32c in the contact member 32 of the device for attaching the plug for heat-conducting tubes 30 comes into contact with the surface which corresponds to the open end of the heat-conducting tubes 5 and is on a side of the water room 7 of the tube plate 4, and the front end of the proximal end 32b in the contact member 32 comes into contact with the other end of the wedge member 23 to regulate a movement of the wedge member 23 to the other end side, and thus the columnar member 22 together with the rod-shaped member 31 moves to the open end of the plug main body 21. For this reason, the tapered surface 22a of the columnar member 22 comes into sliding contact with the tapered surface 23a of the wedge member 23, and a diameter of the wedge member 23 is expanded. As a result, a diameter of a portion having the protrusion 21a of the plug main body 21 is expanded by the wedge member 23, and the protrusion 21a comes into contact with an inner circumferential surface of the heat-conducting tubes 5. Accordingly, the heat-conducting tubes 5 are plugged and thus blocked off by the plug main body 21.

Finally, as illustrated in FIG. 7, the rod-shaped member 31 of the device for attaching the plug for heat-conducting tubes 30 is removed from the columnar member 22, and the plug main body 21, the columnar member 22, and the wedge member 23 included in the plug for heat-conducting tubes 20 are left inside of the heat-conducting tubes 5.

In this way, the plug for heat-conducting tubes 20 according to the Embodiment includes the plug main body 21 which is formed so as to be capable of being inserted into the heat-conducting tubes 5, and is formed with the cylindrical closed end and the cylindrical open end, the columnar member 22 which is capable of being inserted into and removed from the plug main body 21 from the cylindrical open end of the plug main body 21, and in which an outer circumference is provided with the tapered surface 22a having the outer diameter gradually decreasing in the direction of the open end of the plug main body 21 when the columnar member is inserted into the plug main body 21, and the wedge member 23 which is formed so as to be capable of being inserted into and removed from the plug main body 21 from the cylindrical open end of the plug main body 21, and in which an inner circumference is provided with the tapered surface 23a having the inner diameter gradually decreasing in the direction of the open end of the plug main body 21 and opposing the tapered surface 22a of the columnar member 22 when the wedge member is inserted into the plug main body 21.

According to the plug for heat-conducting tubes 20, when the columnar member 22 and the wedge member 23 are inserted into the plug main body 21 such that the tapered surfaces 22a and 23a of the columnar member 22 and the wedge member 23 are opposed to each other, and the columnar member 22 is moved to the open end of the plug main body 21, the tapered surface 22a of the columnar member 22 comes into sliding contact with the tapered surface 23a of the wedge member 23, a diameter of the wedge member 23 is expanded, and thus a diameter of the plug main body 21 expands so that the plug main body 21 comes into contact with the inner circumferential surface of the heat-conducting tubes 5. As a result, the heat-conducting tubes 5 are plugged and thus blocked off by the plug main body 21. In the plug for heat-conducting tubes 20, since the columnar member 22 and the wedge member 23 are formed to be capable of being inserted into and removed from the plug main body 21, the plug main body 21, the columnar member 22, and the wedge member 23 may be separately processed, respectively. Thus, special processing such as conventional drawing is not necessary, and manufacturing may be easily performed. Furthermore, since the plug main body 21, the columnar member 22, and the wedge member 23 may be separate bodies, it is possible to easily conduct an examination before use to maintain a plugging function for the plug main body 21.

In addition, the plug for heat-conducting tubes 20 of the Embodiment includes the plurality of protrusions 21a which are arranged in parallel in a longitudinal direction and are continuous in a circumferential direction on an outer circumference of the plug main body 21 in a portion where the wedge member 23 is disposed in a state in which the columnar member 22 is inserted to reach the blocked portion of the plug main body 21, and the tapered surfaces 22a and 23a of the columnar member 22 and the wedge member 23 are opposed to each other.

According to the plug for heat-conducting tubes 20, since the columnar member 22 is inserted to reach the blocked portion of the plug main body 21, and a position of the wedge member 23 is aligned in a positional relation in which the tapered surfaces 22a and 23a of the columnar member 22 and the wedge member 23 are opposed to each other, it is possible to specify a portion that comes into contact with the inner circumferential surface of the heat-conducting tubes 5 by a diameter expansion of the plug main body 21 associated with a diameter expansion of the wedge member 23. For this reason, when the protrusions 21a are provided to the outer circumference of the plug main body 21 in a portion where the wedge member 23 is disposed, it is possible to appropriately provide the protrusions 21a at a position where the heat-conducting tubes 5 are blocked off, and it is possible to reliably block off the heat-conducting tubes 5. Furthermore, since a portion that comes into contact with the inner circumferential surface of the heat-conducting tubes 5 may be identified by the diameter expansion of the plug main body 21 associated with the diameter expansion of the wedge member 23, it is possible to facilitate processing without needlessly providing the protrusions 21a. At least three protrusions 21a may come into contact with the heat-conducting tubes 5 when blocking off the heat-conducting tubes 5.

In addition, in the plug for heat-conducting tubes 20 of the Embodiment, the wedge member 23 is formed to be harder than the plug main body 21, and is formed to be softer than the columnar member 22. In addition, the wedge member 23 may be provided with a slit in a longitudinal direction of the wedge member 23 to easily expand a diameter of the wedge member 23 by a movement of the columnar member 22.

According to the plug for heat-conducting tubes 20, it is possible to easily expand a diameter of the wedge member 23 by a movement of the columnar member 22, and it is possible to maintain a shape in which a diameter of the plug main body 21 is expanded by the wedge member 23 having an expanded diameter.

In addition, the device for attaching the plug for heat-conducting tubes 30 of the Embodiment includes the rod-shaped member 31 in which the distal end inserted from the open end of the plug main body 21 is fitted to the columnar member 22, the contact member 32 into which the rod-shaped member 31 is inserted, and in which the front end inserted from the open end of the plug main body 21 comes into contact with an end of the wedge member 23, and the movement unit 33 that moves the rod-shaped member 31 such that the rod-shaped member 31 is pulled out from the open end of the plug main body 21.

According to the device for attaching the plug for heat-conducting tubes 30, the columnar member 22 fitted to the rod-shaped member 31 is moved by the movement unit 33, and a movement of the wedge member 23 associated with a movement of the columnar member 22 is regulated by the contact member 32. In this way, it is possible to easily install the plug for heat-conducting tubes 20 in the heat-conducting tubes 5.

In addition, in the device for attaching the plug for heat-conducting tubes 30 of the Embodiment, the front end of the contact member 32 comes into contact with an end of the wedge member 23, and the proximal end of the contact member 32 comes into contact with the verge of opening of the plug main body 21 in a state in which the tapered surfaces 22a and 23a of the columnar member 22 and the wedge member 23 are opposed to each other.

According to the device for attaching the plug for heat-conducting tubes 30, a movement of the wedge member 23 associated with a movement of the columnar member 22 is regulated by the contact member 32 while positioning the plug main body 21 in the heat-conducting tubes 5 in a state in which the plug for heat-conducting tubes 20 is inserted into the heat-conducting tubes 5. Accordingly, it is possible to easily install the plug for heat-conducting tubes 20 in a desired position of the heat-conducting tubes 5.

In addition, the method of plugging the heat-conducting tubes of the Embodiment includes inserting the columnar member 22 into the plug main body 21, subsequently, inserting the wedge member 23 into the plug main body 21, and causing the tapered surfaces 22a and 23a of the columnar member 22 and the wedge member 23 to be opposed to each other, subsequently, inserting the plug main body 21 into the heat-conducting tubes 5, and subsequently, moving the columnar member 22 to the open end of the plug main body 21.

According to the method of plugging heat-conducting tubes, when the columnar member 22 and the wedge member 23 are inserted into the plug main body 21 such that the tapered surfaces 22a and 23a of the columnar member 22 and the wedge member 23 are opposed to each other, and the columnar member 22 is moved to the open end of the plug main body 21, the tapered surface 22a of the columnar member 22 comes into sliding contact with the tapered surface 23a of the wedge member 23, a diameter of the wedge member 23 is expanded, and thus a diameter of the plug main body 21 expands so that the plug main body 21 comes into contact with the inner circumferential surface of the heat-conducting tubes 5. As a result, the plug for heat-conducting tubes 20 may be easily installed in the heat-conducting tubes 5. According to the method of plugging the heat-conducting tubes, when the plug main body 21, the columnar member 22, and the wedge member 23 are separate bodies, respectively, the plug main body 21, the columnar member 22, and the wedge member 23 may be separately processed, respectively. Thus, special processing such as conventional drawing is not necessary, and manufacturing may be easily performed. Furthermore, since the plug main body 21, the columnar member 22, and the wedge member 23 may be separate bodies, it is possible to easily conduct an examination before use to maintain a plugging function for the plug main body 21.

Second Embodiment

The steam generator 1 described above involves a concern that radioactive water leaks from a primary side to mix in non-radioactive water on a secondary side when a side wall of the heat-conducting tubes 5 incorporated therein exceeds a permissible level and thus deteriorates. For this reason, the concern of being mixed is prevented by blocking off an end of the heat-conducting tubes 5 involving deterioration or a possibility of deterioration. In addition, when the steam generator 1 described above is exchanged, and the used steam generator 1 is stored or dismantled, a concern of a radiation leak from the heat-conducting tubes 5 that are being stored or dismantled is prevented by blocking off an end of the heat-conducting tubes 5. A plug for heat-conducting tubes, a device for attaching a plug for heat-conducting tubes, and a method of plugging heat-conducting tubes used to plug and thus block off the heat-conducting tubes 5 in a repair of blocking off the end of the heat-conducting tubes 5 will be described below.

Figure 8:
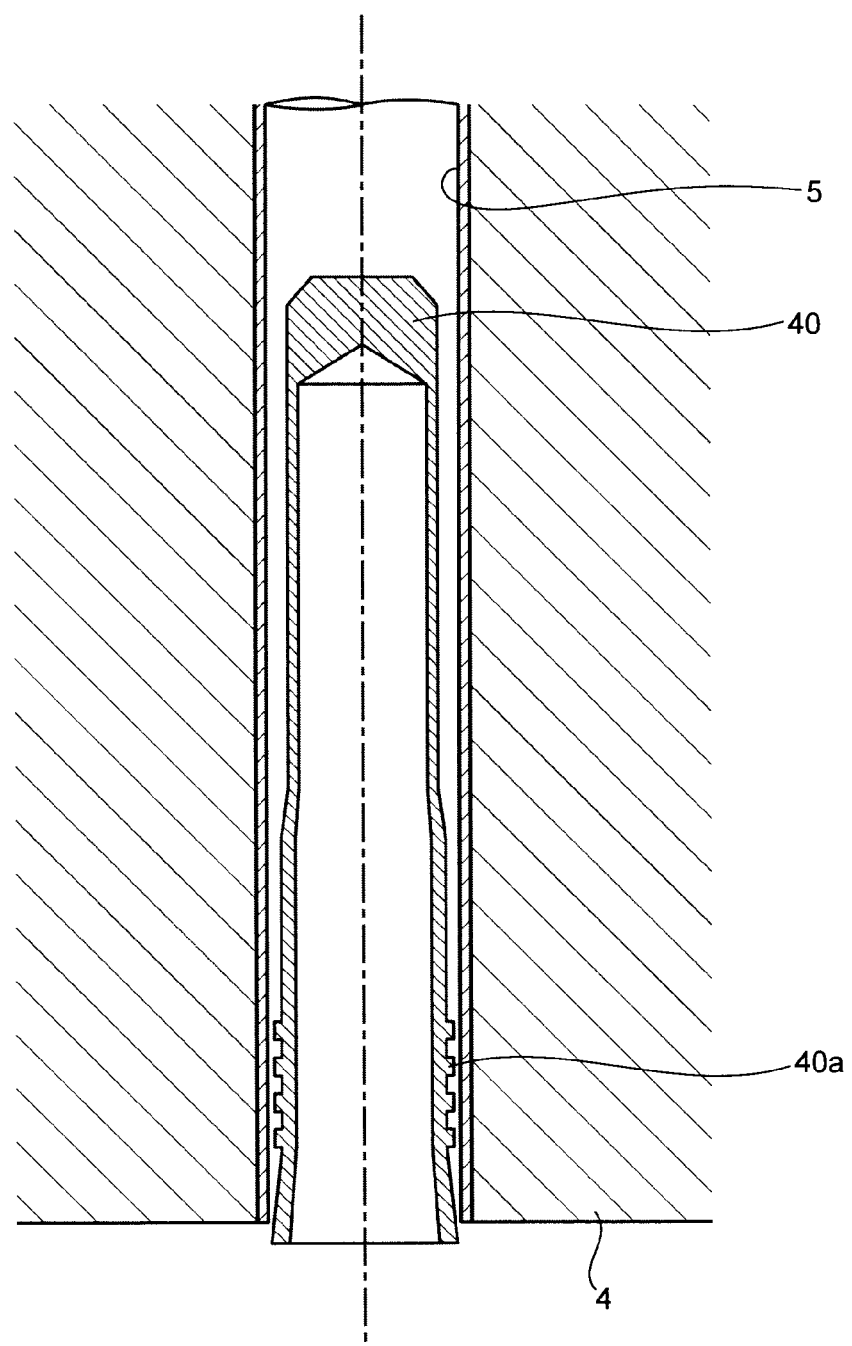
FIG. 8 is a disassembled sectional side view of a plug for heat-conducting tubes according to Second Embodiment of the invention.

FIG. 8 is a disassembled sectional side view of a plug for heat-conducting tubes according to the Embodiment.

As illustrated in FIG. 8, a plug for heat-conducting tubes 40 is formed in a cylindrical shape, and is formed to have an outer diameter smaller than an inner diameter of the heat-conducting tubes 5 so as to be capable of being inserted into the heat-conducting tubes 5 which are provided to be opened at a side of the water room 7 of the tube plate 4. In addition, in the plug for heat-conducting tubes 40, a cylindrical end corresponding to a front end side inserted into the heat-conducting tubes 5 is formed to be blocked, and the other cylindrical end corresponding to a tail end side is formed to be opened. In addition, as illustrated in FIG. 8, the plug for heat-conducting tubes 40 includes a plurality of (four in the Embodiment) protrusions 40a which are arranged in parallel in a longitudinal direction and are continuous in a circumferential direction on an outer circumference. The plug for heat-conducting tubes 40 is formed of a super heat-resistant material (for example, Inconel (registered trademark)) so as to be used in the steam generator 1 in use.

Figure 9:
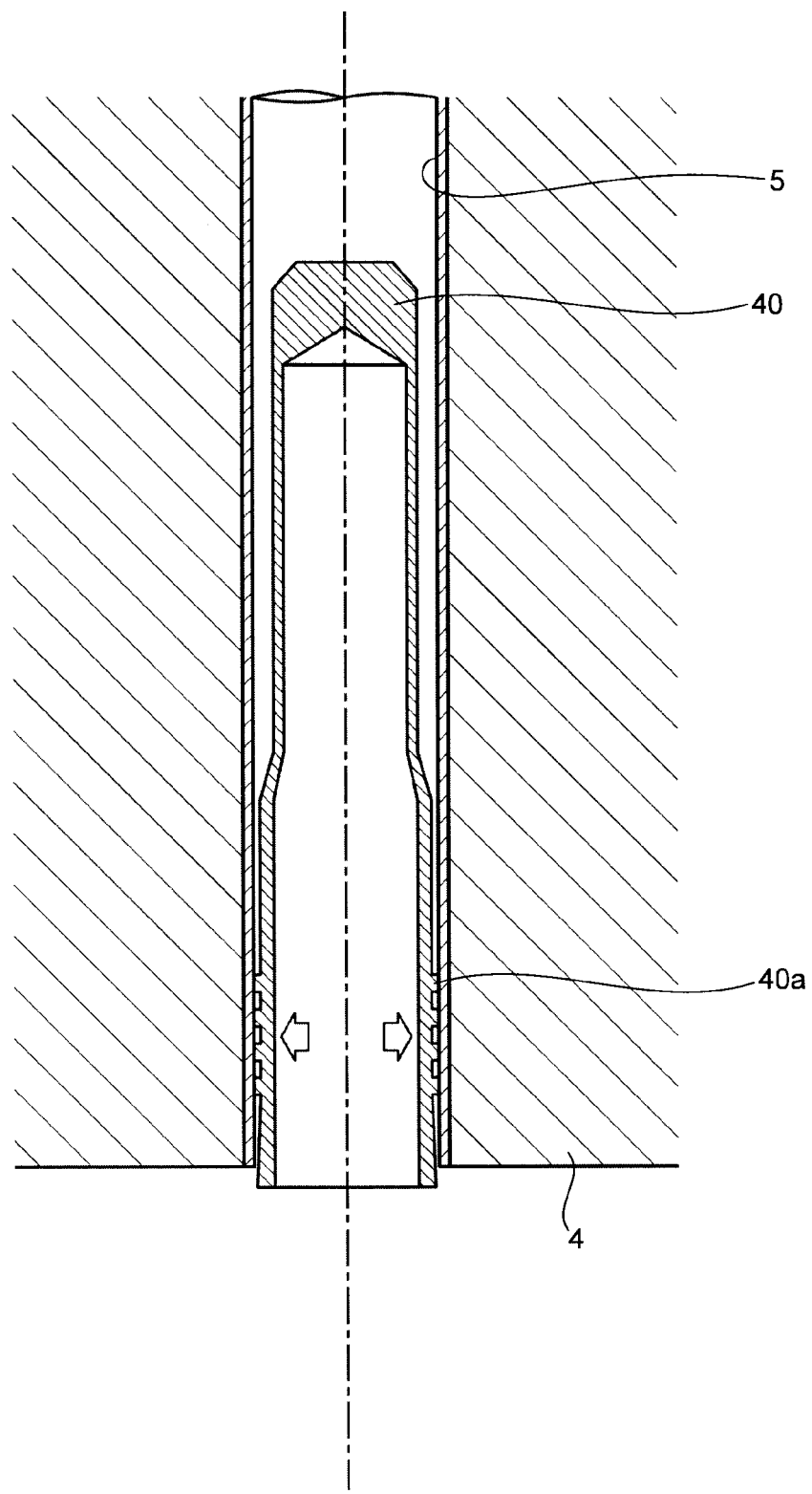
FIG. 9 is a sectional side view illustrating a method of plugging heat-conducting tubes according to Second Embodiment of the invention.

FIG. 9 is a sectional side view illustrating a method of plugging heat-conducting tubes according to the Embodiment.

A method of plugging heat-conducting tubes according to the Embodiment plugs thus blocks off the heat-conducting tubes 5 by the plug for heat-conducting tubes 40 described above.

First, as illustrated in FIG. 8, the plug for heat-conducting tubes 40 is inserted into the heat-conducting tubes 5 from a blocked side.

Next, as illustrated in FIG. 9, when a diameter of the portion including protrusions 40a of the plug for heat-conducting tubes 40 is expanded, the protrusions 40a come into contact with an inner circumferential surface of the heat-conducting tubes 5. In this way, the heat-conducting tubes 5 are plugged and thus blocked off by the plug for heat-conducting tubes 40. Herein, a tube expander used to expand a tube when fixing the heat-conducting tubes 5 to the tube hole 4a of a tube plate 4 is applied to a tool that expands a diameter of the plug for heat-conducting tubes 40. Although not clearly illustrated in the drawing, for example, the tube expander is formed by rotatably and revolvably attaching a satellite roller around a mandrel forming a tapered axis. The tube expander is inserted into the plug for heat-conducting tubes 40, and a tube expansion force is transferred while the satellite roller rotates and revolves when rotating torque is applied while a thrust force is applied to the mandrel at a position including the protrusions 40a to rotate the mandrel, thereby expanding a diameter of the plug for heat-conducting tubes 40.

In this way, the plug for heat-conducting tubes 40 of the Embodiment is formed to be capable of being inserted into the heat-conducting tubes 5, and is formed with a cylindrical closed end and a cylindrical open end.

According to the plug for heat-conducting tubes 40, a structural object may not be included therein, and thus special processing such as conventional drawing is not necessary, and manufacturing may be easily performed. Furthermore, since a structural object may not be included therein, it is possible to easily conduct an examination before use to maintain a plugging function.

In addition, the method of plugging the heat-conducting tubes of the Embodiment includes inserting the plug for heat-conducting tubes 40 into the heat-conducting tubes 5, and subsequently, expanding a diameter of the plug for heat-conducting tubes 40 by the tube expander.

According to the method of plugging the heat-conducting tubes, when the plug for heat-conducting tubes 40 is inserted into the heat-conducting tubes 5 to expand a diameter of the plug for heat-conducting tubes 40 by the tube expander, the diameter of the plug for heat-conducting tubes 40 expands so that the plug for heat-conducting tubes 40 comes into contact with the inner circumferential surface of the heat-conducting tubes 5. As a result, it is possible to easily install the plug for heat-conducting tubes 40 in the heat-conducting tubes 5. According to the method of plugging the heat-conducting tubes, a structural object may not be included on the inside of the plug for heat-conducting tubes 40, and thus special processing such as conventional drawing is not necessary, and manufacturing may be easily performed. Furthermore, since a structural object may not be included therein, it is possible to easily conduct an examination before use to maintain a plugging function.

REFERENCE SIGNS LIST

1 STEAM GENERATOR
4 TUBE PLATE
4a TUBE HOLE
5 HEAT-CONDUCTING TUBES
20 PLUG FOR HEAT-CONDUCTING TUBES

21 PLUG MAIN BODY
21a PROTRUSIONS
22 COLUMNAR MEMBER
22a TAPERED SURFACE
22b INTERNAL THREADED HOLE
23 WEDGE MEMBER
23a TAPERED SURFACE
30 DEVICE FOR ATTACHING PLUG FOR HEAT-CONDUCTING TUBES
31 ROD-SHAPED MEMBER
31a EXTERNAL THREADED PORTION
32 CONTACT MEMBER
32a DISTAL END
32b PROXIMAL END
32c CONTACT SURFACE
33 MOVEMENT UNIT
R AXIS

The invention claimed is:

1. A device for attaching a plug for heat-conducting tube, which is used to mount a plug for heat-conducting tube to the heat-conducting tube,
the plug comprising:
a plug main body which is formed so as to be capable of being inserted into the heat-conducting tube, and is formed with a cylindrical closed end and a cylindrical open end;
a columnar member which is capable of being inserted into and removed from the plug main body from the cylindrical open end of the plug main body, and in which an outer circumference is provided with a tapered surface having an outer diameter gradually decreasing in a direction of the open end of the plug main body when the columnar member is inserted into the plug main body; and
a wedge member which is formed so as to be capable of being inserted into and removed from the plug main body from the cylindrical open end of the plug main body, and in which an inner circumference is provided with a tapered surface having an inner diameter gradually decreasing in the direction of the open end of the plug main body and opposing the tapered surface of the columnar member when the wedge member is inserted into the plug main body,
the device comprising:
a rod-shaped member in which a distal end inserted from the open end of the plug main body is fitted to the columnar member;
a contact member into which the rod-shaped member is inserted, and in which a front end inserted from the open end of the plug main body comes into contact with an end of the wedge member; and
a movement unit that moves the rod-shaped member such that the rod-shaped member is pulled out from the open end of the plug main body, wherein the front end of the contact member comes into contact with the end of the wedge member, and a proximal end of the contact member comes into contact with a verge of opening of the plug main body in a state in which the tapered surfaces of the columnar member and the wedge member are opposed to each other.

2. A method of plugging heat-conducting tube, which is used to mount a plug for heat-conducting tube to the heat-conducting tube and thus plug the heat-conducting tube,
the plug for heat-conducting tube comprising:
a plug main body which is formed so as to be capable of being inserted into the heat-conducting tubes, and is formed with a cylindrical closed end and a cylindrical open end;
a columnar member which is capable of being inserted into and removed from the plug main body from the cylindrical open end of the plug main body, and in which an outer circumference is provided with a tapered surface having an outer diameter gradually decreasing in a direction of the open end of the plug main body when the columnar member is inserted into the plug main body; and
a wedge member which is formed so as to be capable of being inserted into and removed from the plug main body from the cylindrical open end of the plug main body, and in which an inner circumference is provided with a tapered surface having an inner diameter gradually decreasing in the direction of the open end of the plug main body and opposing the tapered surface of the columnar member when the wedge member is inserted into the plug main body,
the method comprising:
inserting the columnar member into the plug main body;
subsequently, inserting the wedge member into the plug main body, and causing the tapered surfaces of the columnar member and the wedge member to be opposed to each other;
subsequently, inserting the plug main body into the heat-conducting tubes; and
subsequently, moving the columnar member to the open end of the plug main body.

3. The device according to claim 1, wherein the front end of the contact member comes into contact with a tube plate into which the heat-conducting tube are inserted and fixed.

* * * * *